July 24, 1956 E. J. BLUM 2,756,334

HIGH FREQUENCY CIRCUITS AND OSCILLATORS

Filed Sept. 28, 1950 2 Sheets-Sheet 1

INVENTOR.
EMILE JAQUES BLUM
BY Louis G. Hochwald
AGENT

July 24, 1956 E. J. BLUM 2,756,334

HIGH FREQUENCY CIRCUITS AND OSCILLATORS

Filed Sept. 28, 1950 2 Sheets-Sheet 2

INVENTOR.
EMILE-JAQUES BLUM
BY [signature]
AGENT

United States Patent Office 2,756,334

Patented July 24, 1956

2,756,334

HIGH FREQUENCY CIRCUITS AND OSCILLATORS

Emile J. Blum, Sevres, France, assignor, by mesne assignments, to Hupp Corporation, Cleveland, Ohio, a corporation of Virginia Application September 28, 1950, Serial No. 187,279

6 Claims. (Cl. 250—36)

The invention relates to modifications of a so-called "butterfly" circuit, more particularly to adapt the circuit to function as an oscillator.

The circuit behaves in effect either as a circuit of variable inductance and distributed capacity or as a transmission line re-entering upon itself with the two high impedance points determined appropriately, being connected respectively to two electrodes such as plate and cathode of a triode.

The operation of prior butterfly circuits with a vacuum tube as an oscillator has been used principally to provide a source of oscillations which is tunable over a relatively large band of frequencies at short wave lengths. In prior oscillator circuits of this type, the power output or amplitude of the oscillations has varied by a considerable amount at certain frequencies in the band which limited the feasibility of their use.

The present invention relates to a circuit of the aforementioned butterfly type which has a substantially constant power output over a band of frequencies which is even greater than has heretofore been obtainable with this type of circuit. The elimination of "holes" or low amplitude oscillations at certain frequencies within the band is effected by use of a coupling device which is variable with the frequency setting of the rotor of the butterfly circuit. This coupling device may be located between the grid of the tube and the axis of the butterfly and disposed electrically between the other two electrodes to control the feedback coupling.

In accordance with this invention, the coupling is preferably capacitive.

In the drawing annexed hereto, examples are shown for realizing an oscillator and an amplifier in accordance with the invention. The invention is, of course, not limited to these examples.

Figure 1:
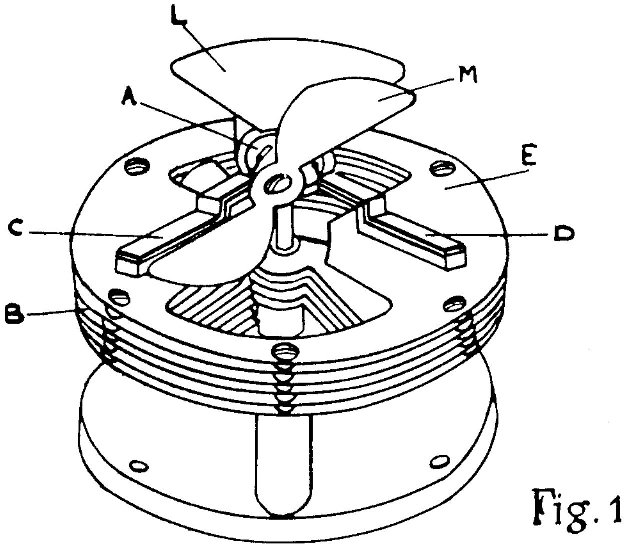
Figure 1 represents an oscillator according to the invention in perspective.
Figure 2:
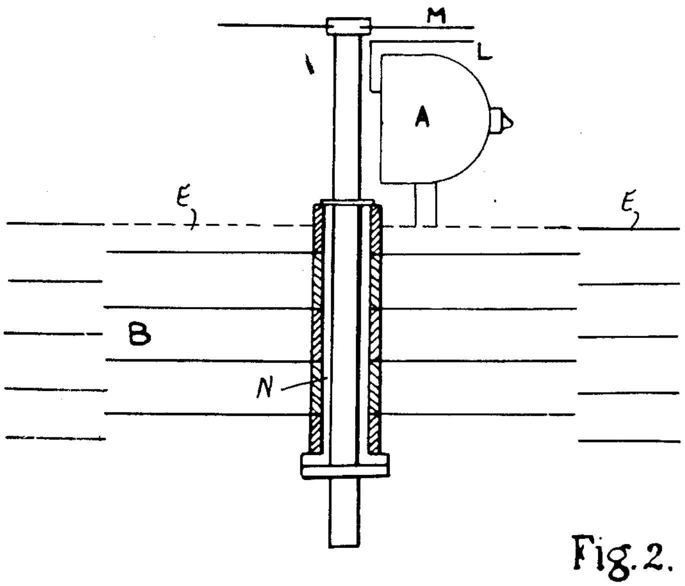
Figure 2 represents an oscillator according to the invention in section.
Figure 3:
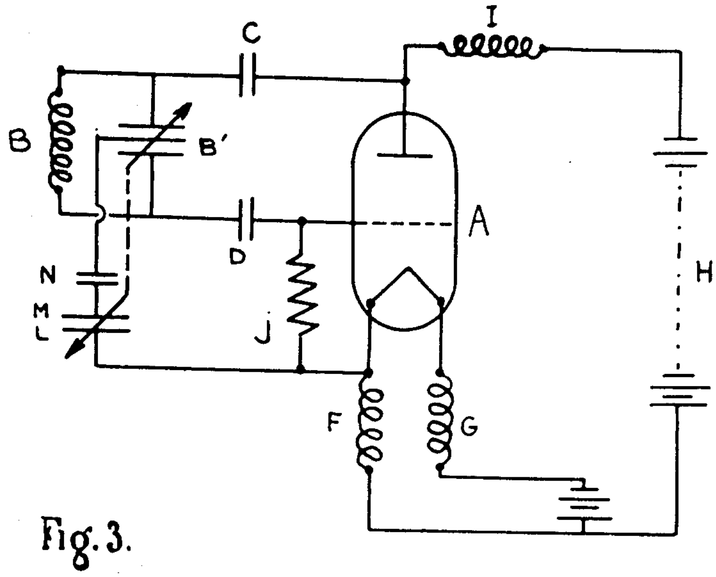
Figure 3 represents a diagram of this oscillator.

As is well known, it is possible to realize oscillators of very high frequency (decimeter and meter waves) with the aid of triodes (A in Figures 1, 2 and 3). An oscillating circuit (B, B′ in Figures 1, 2, and 3) is placed between the grid and plate of triode A; the two terminals of the circuit are connected respectively to these electrodes over condensers C, D, in Figure 3, permitting passage of the high frequency current and blocking the direct current and consisting of the capacitance between arms C and D and plate E in Figure 1. Vacuum tube A is supported on stator means E.

The heating current for the triode passes over chokes (F and G in Figure 3) the inductance of which is high compared to the capacitance of the filament (and of the cathode as the case may be) with respect to the remainder of the arrangement, at the oscillation frequencies considered.

A high voltage source (H in Figure 3) at its positive pole is connected to the plate of tube A over a choke (I in Figure 3) of similar characteristics as chokes F and G. Automatic bias of the grid is assured by a resistance (J in Figure 3) selected in accordance with the characteristics of the triode.

The interelectrode coupling between the different pairs of electrodes provides a significant amount of capacitance in the circuit for oscillations in the frequency range obtained with this type of circuit. In order to maintain the amplitude of the oscillations at substantially the same output level over a considerable band of frequencies, it is necessary to preserve the effective coupling provided by the interelectrode capacities. Prior condenser tuned circuits of the butterfly type used for covering a very large band of frequencies of which I am aware have not had any means for preserving this coupling relation for frequency settings of rotor and accordingly have had "holes" in the output signal level at various frequency settings, particularly near the lower end of the band of frequencies.

In accordance with this invention, increased coupling is provided at lower frequency settings by a pair of plates L and M whose degree of overlap increases as the rotor is tuned to lower frequencies. Blade or plate L is connected with the filament of the tube and blade M is rigidly connected with the axis of the butterfly circuit (Figures 1, 2 and 3) and positioned to pass immediately adjacent blade L thus forming a capacitor separate from the stator and rotor of the butterfly tuner, the capacity of which varies with the frequency setting of the rotor.

The capacitive coupling provided by plates L and M is electrically connected between the filament of tube A and the metallic axis of the butterfly circuit B′ and is preferably located on the side of tube A opposite the butterfly tuner to reduce any interaction therebetween. Thus as the frequency decreases and the effective coupling provided by the interelectrode capacitance in the tube decreases, an increased coupling between both the grid and the filament and the plate and the filament is supplied by the auxiliary capacitor formed by plates L and M. It will be noted that the axis of the butterfly circuit is actually disposed electrically between the grid and the anode. Condenser N in Figure 3 represents the capacity between the rotor blade assembly and the axis of the butterfly circuit, and being in series with the capacity of plates L and M, reduces the sensitivity of the coupling provided by plates L and M on the overall coupling between the filament and both the grid and the anode.

The invention is not only concerned with oscillator arrangements, it also applies to all assemblies in which a butterfly type circuit is employed and where it is useful to cause the capacity of the assembly to vary with the tuning frequency of the butterfly.

Figure 4:
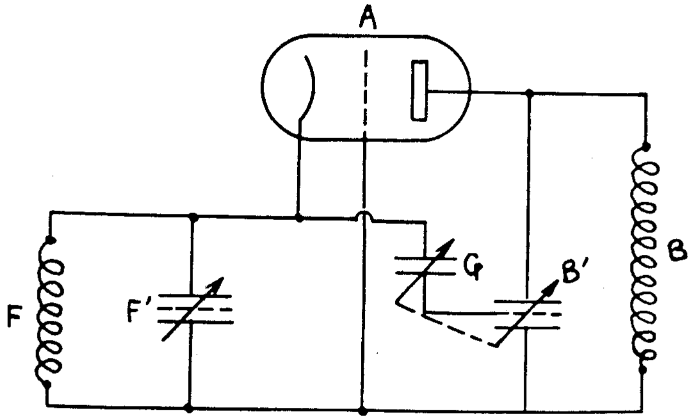
Figure 4 represents a diagram of an amplifier according to the invention.

For example, very schematically there is represented in Figure 4 an amplifier in accordance with the aforesaid principle. F, F′ is an input butterfly circuit, A is the triode, and B, B′ the butterfly circuit coupled with blade assembly G in accordance with the invention in the plate circuit.

In this arrangement it will be possible to increase amplification by feeding back into the input circuit over condenser G a portion of the energy amplified in the anode circuit. Condenser G varies with the frequency in accordance with the invention.

D. C. voltages to filament, grid, and plate are supplied in a manner similar to that illustrated in Figure 3.

I claim:

1. In an oscillator for a very high frequency range, a tunable circuit of the butterfly type having stator means and rotor means, the latter including an axis, a vacuum tube having its plate and grid connected to said stator means and a cathode coupled to said rotor means, and means variable with the frequency setting of the rotor for varying the coupling between said rotor means and said cathode, including a variable capacity comprising a first blade spaced axially from said rotor and stator means and movable with said axis and a fixed blade connected to said cathode, said fixed blade being spaced axially from said stator means to form a capacitance with said first blade.

2. In an oscillator for a very high frequency range, a tunable circuit of the butterfly type having stator means and rotor means, the latter including an axis, a vacuum tube supported on said stator means, said vacuum tube having its plate and grid connected to said stator means and having a cathode coupled to said rotor means, and means variable with the frequency setting of the rotor for varying the coupling between said rotor means and said cathode, including a variable capacity having a first blade spaced axially from said rotor and stator means and movable with said axis and a fixed blade connected to said cathode, said fixed blade being spaced axially from said stator means to form a capacitance with said first blade.

3. In an oscillator tunable over a wide band of frequencies, a circuit of the butterfly type including stator and rotor means, a three electrode vacuum tube having its anode and grid coupled to said stator means, and a cathode coupled to said rotor means; the latter coupling including means variable with rotor position to provide increased coupling as the tuning frequency of the butterfly circuit decreases comprising a variable capacitor having a first plate separate from but capacitively coupled to and movable with said rotor means and a fixed plate directly connected to said cathode.

4. An oscillator circuit including, in combination a tunable circuit of the butterfly type having rotor and stator means, and a tube having grid and anode connected to said stator means and cathode coupled to said rotor means; said rotor means having a metallic axis capacitively coupled thereto; said cathode to rotor coupling including a coupling between the cathode and the metallic axis, said last mentioned coupling being variable with the position of the rotor means and arranged to increase the coupling between the cathode and metallic axis as the frequency setting of the rotor is decreased.

5. An oscillator circuit as defined in claim 4 wherein said tube is supported on said stator means.

6. An oscillator circuit as defined in claim 4 wherein said tube is supported on an end plate of said stator means and said last mentioned coupling comprises a pair of spaced parallel plates forming a capacitor, said pair of plates being positioned on the side of said tube opposite from the location of the rotor and stator means.

References Cited in the file of this patent

UNITED STATES PATENTS

| | | |
|---|---|---|
| 2,385,131 | Garthwaite | Sept. 18, 1945 |

FOREIGN PATENTS

| | | |
|---|---|---|
| 510,226 | Great Britain | July 28, 1939 |
| 592,131 | Great Britain | Sept. 9, 1947 |